United States Patent
Farrell et al.

(10) Patent No.: US 7,576,874 B2
(45) Date of Patent: Aug. 18, 2009

(54) METHODS AND SYSTEMS FOR MIXED CHROMA PRINT JOBS

(75) Inventors: Michael E Farrell, Williamson, NY (US); Javier A Morales, Irondequoit, NY (US)

(73) Assignee: Xerox Corporation, Norwalk, CT (US)

( * ) Notice: Subject to any disclaimer, the term of this patent is extended or adjusted under 35 U.S.C. 154(b) by 982 days.

(21) Appl. No.: 11/094,442

(22) Filed: Mar. 31, 2005

(65) Prior Publication Data

US 2006/0227354 A1    Oct. 12, 2006

(51) Int. Cl.
| | |
|---|---|
| G06K 15/00 | (2006.01) |
| G06K 15/10 | (2006.01) |
| G06F 3/12 | (2006.01) |
| G06F 17/01 | (2006.01) |
| H04N 1/21 | (2006.01) |
| H04N 1/40 | (2006.01) |

(52) U.S. Cl. .................. 358/1.13; 358/2.1; 358/1.8; 358/296; 358/442

(58) Field of Classification Search .............. 358/296, 358/2.1, 1.13, 1.8, 1.14, 1.15; 399/79; 709/245
See application file for complete search history.

(56) References Cited

U.S. PATENT DOCUMENTS

| | | | | |
|---|---|---|---|---|
| 5,287,194 | A | * | 2/1994 | Lobiondo ................... 358/296 |
| 6,041,200 | A | | 3/2000 | Glass et al. |
| 6,064,838 | A | * | 5/2000 | Maruta et al. ................. 399/79 |
| 6,874,034 | B1 | * | 3/2005 | Hertling ..................... 709/245 |
| 6,943,905 | B2 | * | 9/2005 | Ferlitsch .................... 358/1.13 |
| 7,127,433 | B2 | * | 10/2006 | Baker ......................... 358/1.8 |
| 7,256,901 | B2 | * | 8/2007 | Ferlitsch .................... 358/1.13 |
| 7,286,250 | B2 | * | 10/2007 | Kujirai et al. ............. 358/1.15 |
| 2002/0075501 | A1 | * | 6/2002 | Mantell et al. ............ 358/1.14 |
| 2004/0184106 | A1 | * | 9/2004 | Ferlitsch .................... 358/2.1 |

* cited by examiner

*Primary Examiner*—King Y Poon
*Assistant Examiner*—Akwasi M Sarpong
(74) *Attorney, Agent, or Firm*—Oliff & Berridge, PLC

(57) ABSTRACT

A method for processing a print job including both monochrome and color pages may include receiving values for characteristic parameters, selecting an optimization criterion and determining a process mode that corresponds to a minimum value of the selected criterion. The characteristic parameters may include printing operations, non-automated processing operations and the print job. The optimization criterion may be selected from at least one of a completion time and/or a process cost.

11 Claims, 4 Drawing Sheets

METHODS AND SYSTEMS FOR MIXED CHROMA PRINT JOBS

BACKGROUND

This disclosure relates to optimizing the production of print jobs containing a mix of monochrome and color pages based on process speed and/or cost.

The production of some documents includes information presented using multiple color hues in addition to monochrome text, such as dark (e.g., black) characters on a pale (e.g., white) background surface. Printing such documents into hard copy form may involve decisions based on competing resource availabilities. Assessing tradeoffs can be time-consuming and arbitrary, often yielding inefficient allocation of resources.

SUMMARY

Various exemplary embodiments provide a method for processing a print job that includes both monochrome and color pages including receiving values for characteristic parameters, selecting an optimization criterion and determining a process mode that corresponds to a minimum value of the selected criterion. The characteristic parameters may include printing operations, non-automated processing operations and the print job. The optimization criterion may be selected from completion time and/or process cost.

Various exemplary embodiments provide methods for determining a minimum time from a split mode time and a color mode time. Exemplary embodiments may also include determining costs for split mode, color-black mode and color-only modes, and determining the minimum cost between such modes. Exemplary embodiments may also include basing the process mode determination on per-page process rate and/or a per-page cost for the printers, and may include counting of the monochrome and color pages.

Various exemplary embodiments provide a machine-readable storage medium having executable software code for processing combined monochrome and color data for a printing system. Various exemplary embodiments also provide an apparatus for processing combined monochrome and color data for a printing system.

BRIEF DESCRIPTION OF THE DRAWINGS

Various details are described below with reference to the following figures, wherein.

DETAILED DESCRIPTION OF EMBODIMENTS

The following detailed description refers to a printing system. The printing system, may refer to, for example, dry toner printers (including Xerographic printers), ink jet printers, etc., for the sake of clarity and familiarity. However, it should be appreciated that the principles described herein, may be equally applied to any known or later-developed printing systems, beyond the examples specifically discussed herein.

Figure 1:
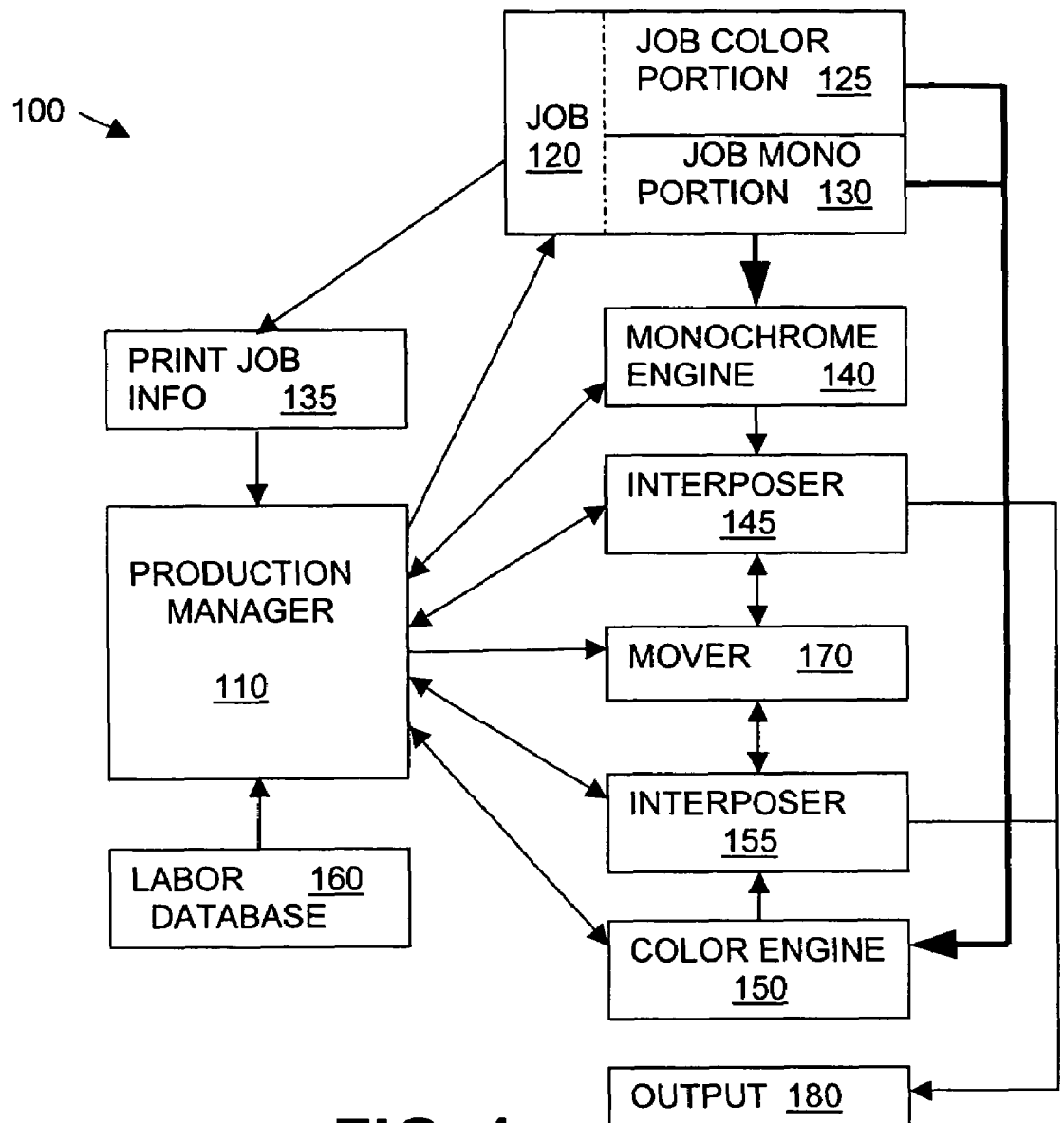
FIG. 1 shows an exemplary block diagram of a combined monochrome and color data printing system.

FIG. 1 shows an exemplary block diagram of a printing system 100, such as for Xerographic document processing and reproduction. A production manager 110 serves as an interface between a mixed or combined media print job 120 to be processed and the printers. The media may include hard-copy images, image data files, etc.

The print job 120 may be subdivided into a color portion 125 (having images of multiple colors) and a monochrome portion 130 (such as black-text-on-bleached paper). For split mode processing, the subdivision may involve segregation of the color pages and the monochrome pages into separate collections. Information regarding the print job 120 may be acquired and stored in an information database 135 to provide job information to the production manager 110.

The printed reproduction of the documents for the print job 120 may be performed by a monochrome print engine 140 and/or a color print engine 150, with the assigned printing tasks shown by the thick-line arrows. Information regarding the print speed, cost per page, output capacity, etc. may be provided from the engines to the production manager 110. Additionally, information from a labor database 160 may be provided to the production manager 110.

The monochrome and color print engines 140, 150 may include a monochrome interposer module 145 and a color interposer module 155, respectively. An interposer module may represent a paper-handling device containing a feeder module that inserts media into a paper path of the associated print engine, while bypassing a marking module that imprints an image on the media, such as by depositing ink or toner at relative positions corresponding to an input image.

If the print job 120 requires the use of both print engines (referred to as a split process or job), the output from one print engine may be combined into the appropriate page order by an interposer module associated with the other print engine. Typically, for example, the printed output from the monochrome print engine 140 may be transported by a mover 170 to the color interposer module 155 of the color print engine 150. Alternatively, the printed output from the color print engine 150 may be transported by the mover 170 to the monochrome interposer module 145 of the monochrome print engine 140. The transferred sheets from the interposer module may be inserted inline for combining with the printed sheets from the corresponding marker module. In either event, the combined final job production may then be submitted to an output 180.

Based on the job, engine and labor information, the production manager 110 optimizes the mode of printing and may submit instructions for the job 120, the monochrome and color engines 140, 150, and the respective monochrome and color interposer modules 145, 155. The optimization may be performed using various criteria regarding completion of the printing task, such as, for example, minimized time $T_{min}$ and minimized expenditure cost $E_{min}$, to be selected by the operator or user.

The comparison of production methods for printing copies may include (1) color-only: producing the entire print job on the color print engine 150 in the color mode; (2) color-black: producing both monochrome and color portions on the color print engine 150 with the monochrome portion conducted in the black-only mode and the color portion in the color mode; (3) split process (separate monochrome and color printing) with monochrome insertion: separately producing the monochrome portion on the monochrome print engine 140 and the color portion on the color print engine 150, with the monochrome pages transferred to the color interposer module 155 for combining at the output 180; and (4) split process with color insertion: separately producing the monochrome and color portions as described above, with the color pages transferred to the monochrome interposer module 145 for combining at the output 180. Determining optimized time or cost may yield a preference for one of these four modes to perform the print job.

The information used by the production manager 110 from the print engines 140, 150 may include values received for machine-performance parameters. These may include engine speed (in processed pages per unit time), unit cost or "click charge" per reproduced page, and transitional load capacity before offloaded for output. These performance parameters may depend on factors external to the print engines, such as previously scheduled tasks, relative priorities between competing job, hourly and seasonal demand variations.

The click charge may be associated with the marker module of one of the print engines that imposes the reproduced image onto the printed sheet. The click charge may vary depending on the type of printer, as well as the printing mode. For example, the click charge may be lower for the color print engine 150 in the black-only mode than in the color mode, and lower still for the monochrome print engine 140. After being printed from the one of the print engines and transferred to the other of the print engines, the interposed sheet may thereby avoid an additional click charge by being fed through the other of the interposer modules.

Similarly, the information used by the production manager 110 from the print job 120 may also include values received for parameters related to document characteristics and user selections. These values may include the count (i.e., integer number) of document pages in monochrome and color, e.g., text, and in color, the thickness or weight of the medium (particularly color pages), and the number of total copies to be produced. Exemplary values may be labeled as the number of monochrome pages $N_W$, the number of color pages $N_R$. Derivable values may include the total number of pages in the batch $N_A$, the number of copies to be produced $N_S$, and the total number of batches $N_B$.

The number of pages in the batch $N_A$ may be defined as the lesser value of (1) the total number of pages to be inserted and (2) the load capacity of the intermediate or output devices. The total number of inserted pages may correspond to either the number of monochrome pages $N_W$ (for inserting through the color interposer module 155), or the number of color pages $N_R$ (for inserting through the monochrome interposer module 145). The intermediate devices, such as the interposer modules 145 and 155, may have load capacities for their respective feeders.

The output devices, such as the print engines 140 and 150 that produce the pages for insertion, may have load capacities for their respective output trays. Consequently, a load capacity L may be designated for the monochrome interposer module $L_{IM}$, the color interposer module $L_{IC}$, the monochrome print engine $L_{PM}$ and the color print engine $L_{PC}$. The load capacity L may be represented by a number of pages or by another quantifying value.

A set may correspond to a print job order, such that the number of sets $N_S$ may be defined as a number of copies of an original document or image. A batch may correspond to a physical collection of sheets that may be transferred to one of the interposer modules 145, 155. The number of batches $N_B$ for a print job may be driven by the minimum load capacity $L_{min}$ of all the transfer devices, such as the mover 170, the feeders of the interposer modules 145, 155, and the output trays of the print engines 140, 150. The number of batches $N_B$ may be related to the minimum load capacity $L_{min}$, divided by the number of pages in a batch $N_A$.

In addition, the production manager 110 may include characteristic parameters relating to human labor and other forms of non-automated processing. Labor may involve process cost such as for transferring monochrome copies from a batch (for example, by the mover 170) to either the monochrome interposer module 145 or the color interposer module 155 for compilation. The labor effort to transfer the copies from one print engine to the other interposer module may occur over a shift or transfer time $T_S$.

The page insertion task may be performed while printing the pages. The interposing (or insertion) time $T_I$ may be calculated as the print time for a single sheet multiplied by an efficiency coefficient Z. The single-sheet print time may be represented by the inverse of the printing speed S of the print engines 140, 150. The efficiency coefficient Z may reflect the ability of the print engines 140, 150 to insert a sheet concurrently with the other printing operations, and may range in value from zero for full concurrency, to unity for a fully skipped page insertion cycle. The efficiency coefficient Z may result from different space allocations assigned for printed and interposed pages that may accommodate single- and double-sided printing.

These values for speed interposing time $T_I$, print engine speed S, efficiency coefficient Z may be distinguished for the monochrome and color print engines by their respective subscripts M and C. For example, the engine speed may be distinguished as monochrome engine speed $S_M$ and two separate color engine speeds: $S_C$ for color printing and $S_K$ for black printing. Values for the color engine speed $S_C$ may vary depending on the comparative ability of the color print engine to handle various media thicknesses and densities. Printing speed may also depend on whether the print engine receives a continuous sheet from a paper roll, or pre-cut sheets.

For the color-only mode, the color print engine 150 may produce the set number of copies $N_S$ for the print job 120 by printing all pages in color. The method may calculate $T_{CO}=N_S(N_W+N_R)/S_C$, as the process time involved for printing all the monochrome and color pages by the color print engine 150. Because the color print engine 150 may perform the entire task in a single sequence, inserting operations by the either of the interposer modules and transferring operations by the mover 170 may be omitted from the color-only time calculation.

For the color-black mode, the color print engine 150 may produce the set number of copies $N_S$ for the print job 120, with the color pages printed in color, and the monochrome pages printed separately in black-only. The system may calculate the process time as $T_{CK}=N_S\{(N_W/S_K)+(N_R/S_C)\}+T_{IC}$, for separately printing the monochrome pages and color pages by the color print engine 150. Although transferring operations by the mover 170 may be omitted from the color-black time calculation, the time $T_{IC}$ for insertion operations of the monochrome pages by the color interposer module 155 may optionally be included.

The interposing time in the monochrome interposer module 145 may be determined as period $T_{IM}=Z_M N_S(N_R/S_M)$ for all insertion operations. Correspondingly, the non-concurrent interposing time in the color interposer module 155 may be determined as period $T_{IC}=Z_C N_S(N_W/S_C)$ while the monochrome print engine 140 may print the monochrome copies.

For the split process mode, the color print engine 150 may print the color pages and the monochrome print engine 140 may print the monochrome pages for the print job 120. For monochrome insertion, the monochrome pages may be transferred to the color interposer module 155 and for inclusion with the separately printed color pages as these are also concurrently printed. For color insertion, the color pages may be transferred to the monochrome interposer module 145 and for inclusion with the concurrently printed monochrome pages.

The system may calculate the time for the split printing process with monochrome insertion as $T_{PM} = N_A/S_M + N_S(N_R/S_C) + T_{IC}$. The first term represents the time for printing the requisite number of monochrome pages as the number of pages in a batch $N_A$ by the monochrome print engine 140 at speed $S_M$ and transferred over the number of batches $N_B$ based on the load capacity $L_M$ of the monochrome print engine 140. The second term represents the time for printing the number of sets $N_S$ of the requisite the number of color pages $N_R$ by the respective color printer 150 at speed $S_C$. The third term represents the insertion time $T_{IC}$ for the monochrome pages in the color interposer module 155 for the split process mode with monochrome insertion.

Similarly, the system may calculate the time for the split printing process with color insertion as $T_{PC} = N_A/S_C + N_S(N_W/S_M) + T_{IM}$. The first term represents the time for printing the requisite number of color pages as the number of pages in a batch $N_R$ by the color print engine 150 at speed $S_C$ and transferred over the number of batches $N_B$ based on the load capacity $L_C$ of the color print engine 150. The second term represents the time for printing the number of sets $N_S$ of the requisite the number of monochrome pages $N_W$ by the monochrome printer 140 at speed $S_M$. The third term represents the insertion time $T_{IM}$ for the color pages in the monochrome interposer module 145 for the split process mode with color insertion.

Figure 2:
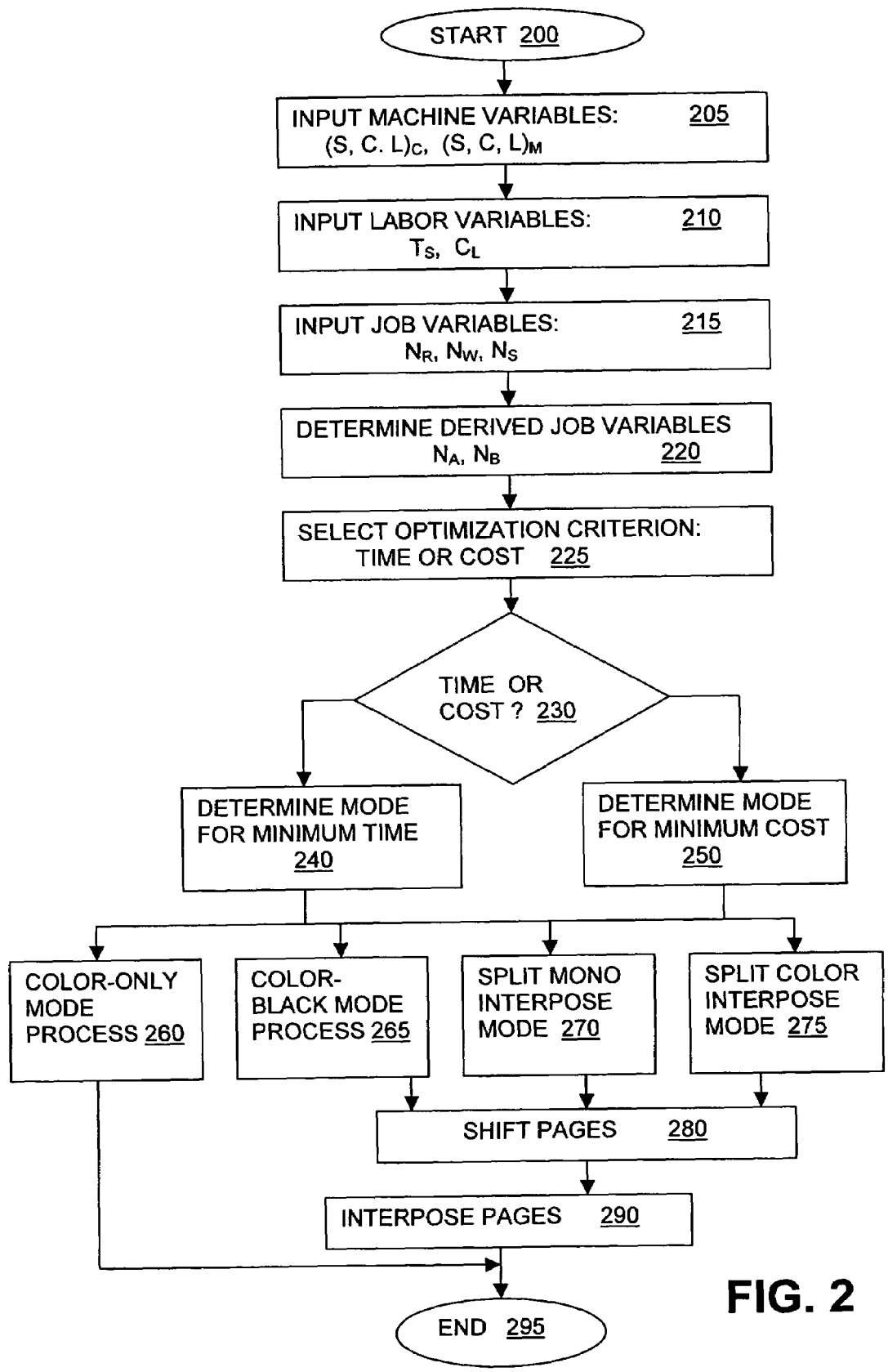
FIG. 2 shows an exemplary flow chart for determining an optimized process mode.

FIG. 2 illustrates a flow chart for determining the optimum process mode. The process begins in step S200 and proceeds to input machine variables for the print engines in step S205, such as engine speed S, click charge C and sheet capacity loads L for the color and monochrome machines for interposing and printing. The process continues to step S210 to input labor variables, such as labor shift time $T_S$ and labor rate cost $C_L$ for moving and interposing tasks. The process continues to step S215 to input print job variables, such as the number of color pages $N_R$, the number of monochrome pages $N_W$, the number of sets $N_S$ to be produced. The process continues to step S220 to determine interaction variables from the job variables and the machine variables, such as the total number of pages $N_A$ per batch and the number of batches $N_B$ to be transferred.

The process continues to step S225 where the optimization criterion may be selected. The process continues to step S230 to query the selection for minimizing time or cost. For minimum process time, the method diverts to step S240 to determine the time-optimized print mode. Conversely, for minimum job cost, the method diverts to step S250 to determine the cost-optimized print mode. Based on the input conditions, minimizing time may yield selection of the color-only mode in step S260, the color-black mode in step S265, the split monochrome-interpose mode in step S270 or the split color-interpose mode in step S275.

The process in the color-black mode in step S265, the split monochrome-insertion mode in step S270 or the split color-insertion mode in step S275 may involve moving the color or monochrome copies in step S280 to feed into the other corresponding interposer module. The process continues to step S290 to interpose the monochrome and color pages. From either the color-only mode process in step S260 or the interposing process at step S290, the method then terminates in step S295.

Figure 3:
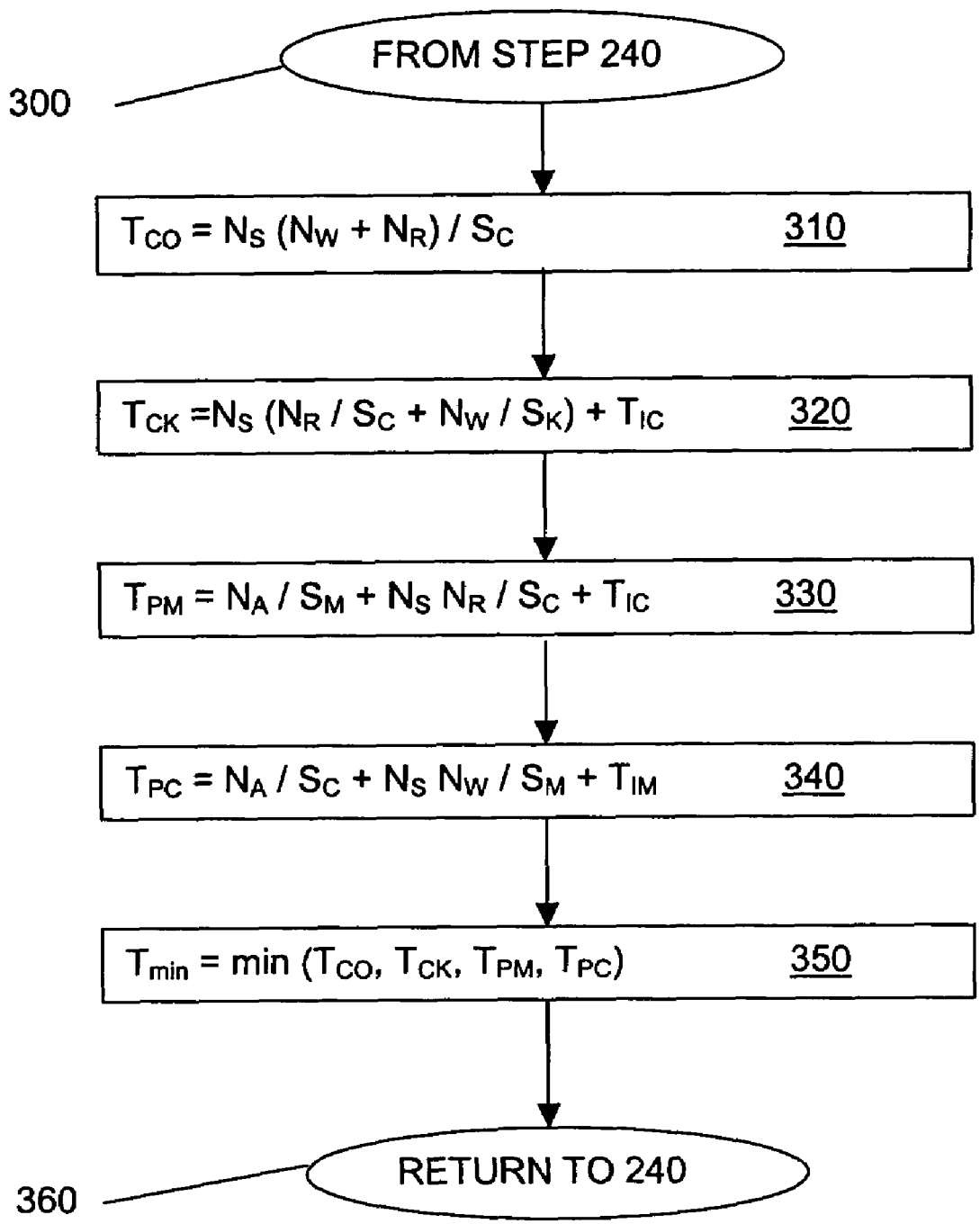
FIG. 3 shows an exemplary flow chart for determining a minimum process time.

FIG. 3 illustrates a flow chart for determining the minimum time in response to that selection by the user in FIG. 2 as the optimization criterion in step S240. The method begins in step S300 as from step S250 in FIG. 2 and proceeds through steps S310-S340 to calculate the time needed to print all the monochrome and color pages for the set number of copies.

In step S310, the time may be calculated for color-only as $T_{CO}$: all pages printed by the color print engine 150 in the color-only mode. In step S320, the time may be calculated for the color-black mode as $T_{CK}$: color pages printed by the color print engine 150 in color, and monochrome pages printed by the color print engine 150 in black-only.

In step S330, the time may be calculated for the split process mode with monochrome insertion as $T_{PM}$: monochrome and color pages printed by their respective monochrome and color print engines 140, 150, while the monochrome pages transferred to the color interposer module 155. In step S340, the time may be calculated for the split process mode with color insertion as $T_{PC}$: monochrome and color pages printed by their respective monochrome and color print engines 140, 150, while the color pages transferred to the monochrome interposer module 145.

The process continues to perform a comparison in step S350 to determine the minimum of these process times. The mode that corresponds to the minimum valued period may be returned to step S240 in FIG. 2. This may be expressed as $T_{min} = \min(T_{CO}, T_{CK}, T_{PM}, T_{PC})$. The method then terminates in step S360.

The time calculating operations may be expressed as a matrix or a table. For example, the time values may be represented in linear algebra form by a four-valued tensor t calculated from a four-by-four input variable matrix A and a four-valued speed tensor s by the relation t=A·s as follows:

$$\begin{bmatrix} T_{CO} \\ T_{CK} \\ T_{PM} \\ T_{PC} \end{bmatrix} = \begin{bmatrix} N_S(N_W + N_R) & 0 & 0 & 0 \\ N_S N_R & N_S N_W & 0 & T_{IC} \\ N_S N_R & 0 & N_A & T_{IC} \\ N_A & 0 & N_S N_W & T_{IM} \end{bmatrix} \begin{bmatrix} 1/S_C \\ 1/S_K \\ 1/S_M \\ 1 \end{bmatrix} \quad (1)$$

To minimize process cost of a mixed media print job, such as in step S250 in FIG. 2, the print queue optimization method may determine and compare total costs between the following three modes: The first mode cost $E_{CO}$ represents executing the print job entirely on the color print engine 150 in the color-only mode. The second mode cost $E_{CK}$ represents executing the print job entirely on the color print engine 150 with the job color portion 125 performed in color, while the job monochrome portion 130 performed in black-only.

The third mode cost $E_P$ represents executing the print job in split mode, between the monochrome and color print engines 140, 150. The split mode performs the job monochrome portion 130 by the monochrome print engine 140 while executing the job color portion 125 by the color print engine 150, with the separate monochrome and color outputs interposed and combined.

For example, the color-only mode cost $E_{CO}$ may be represented as the sum of the color and monochrome pages $N_R$, $N_W$ multiplied by the number of sets $N_S$ multiplied by the click charge $C_C$ for the color print engine 150. The color-only mode cost may be expressed thereby as $E_{CO} = N_S(N_R + N_W)C_C$.

The color-black mode cost $E_{CK}$ may be calculated by the sum of the number of sets times the product of the number of color pages $N_R$ and the color click charge $C_C$ together with the product of the number of monochrome pages $N_W$ and the click charge $C_K$ for the color print engine in the black-only mode, plus the product of the number of batches $N_B$, the labor shift time to transfer copies $T_S$ and the labor rate cost $C_L$. Thus, the black-only mode cost may be expressed thereby as $E_{CK} = N_S\{(N_R C_C) + (N_W C_K)\} + (N_B T_S C_L)$. Depending on the characteristics of the print job 120, the resources expended for interposing may be comparable or exceed to the higher click charges of the color-only mode.

The split mode cost $E_P$ may be calculated by the sum of the number of sets $N_S$ times the product of the number of color pages $N_R$ and the color click charge $C_C$ with the product of the number of monochrome pages $N_W$ and the monochrome click charge $C_M$, plus the product of the number of batches $N_B$, the labor time to transfer copies $T_S$ and the labor cost $C_L$. The split mode cost may be expressed thereby as $E_P = N_S\{(N_R C_C) + (N_W C_M)\} + (N_B T_S C_L)$. The number of batches due to the load capacity and the consequential shifts required may significantly influence the total cost for the split mode.

The cost calculating operation may be expressed as a matrix as a table. For example, the cost values may be represented in linear algebra form by a three-valued tensor e calculated from a four-by-three input variable matrix B and a four-valued charge tensor c by the relation e=B·c as follows:

$$\begin{bmatrix} E_{CO} \\ E_{CK} \\ E_P \end{bmatrix} = \begin{bmatrix} N_S(N_R + N_W) & 0 & 0 & 0 \\ N_S N_R & N_S N_W & 0 & N_B T_S \\ N_S N_R & 0 & N_S N_W & N_B T_S \end{bmatrix} \begin{bmatrix} C_C \\ C_K \\ C_M \\ C_L \end{bmatrix} \quad (2)$$

Figure 4:
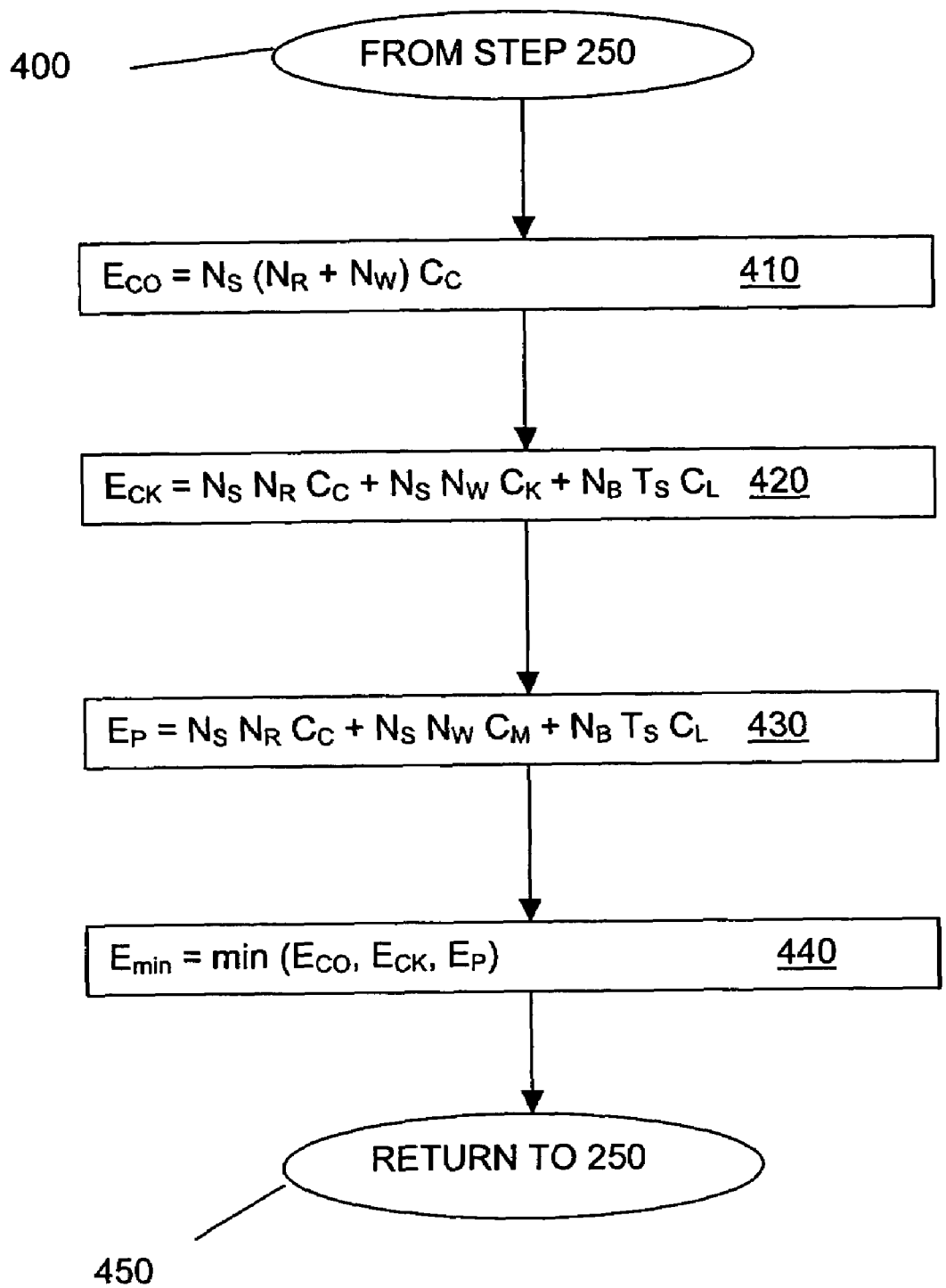
FIG. 4 shows an exemplary flow chart for determining a minimum process cost.

FIG. 4 illustrates a flow chart for determining the minimum process cost in response to that selection by the user in FIG. 2 as the optimization criterion in step S240. The method begins in step S400 as from step S250 in FIG. 2 and proceeds to calculate the color-only cost $E_{CO}$ in step S410, the color-black cost $E_{CK}$ in step S420 and the split mode cost $E_P$ in step S430.

These costs depend from the number of color and monochrome pages $N_R$, $N_W$, the number of sets $N_S$, the number of batches $N_B$, the interval for labor shift time $T_S$ to move batches to the interposers, the click charges for color-only, color-black and monochrome printing $C_C$, $C_K$ and $C_M$, as well as labor rate cost $C_L$. The process continues to step S440 to compare costs between the color-only mode $E_{CO}$ with the color-black mode $E_{CK}$ and the split mode $E_P$ in order to determine the minimum cost $E_{min}$.

Upon determining the minimum cost, the process terminates in step S450 and returns to step S240 to implement the determined process in FIG. 2 for executing the print job. Those of ordinary skill in the art will recognize that two or more print costs, such as color-only $E_{CO}$, color-black $E_{CK}$ and split mode $E_P$ can be contemporaneously or sequentially compared to achieve the intended result.

Various exemplary embodiments may include performing optimization based on minimum cost for a cost result and on minimum time for a time result. The cost and time results may be weighed to provide an overall score. Various exemplary embodiments may alternatively include performing optimization based on concurrent combination of minimum cost and minimum time.

For example, a print shop may configure a production management and scheduling system to automatically route print jobs based on the lowest cost, unless the system determined that either the current job was at risk of being delivered late and the cost differential was beneath a certain threshold, or the cost savings associated with the more complex workflow also fell beneath another certain threshold. This threshold could be expressed either as an absolute amount or a percentage of the total cost of the job.

This invention may also be used in other situations where some pages are produced in a manner that involves a cost premium. For example, printing with Magnetic Ink Character Recognition (MICR) toner involves a cost premium over printing with standard toner formulations. MICR toner is often used for printing documents that may be read by automated high-speed scanners, such as, for example, the printing of router numbers on personal cheques.

Other examples include printing documents using HiFi Colors such as Hexachrome® from PANTONE®, Inc. when only a subset of document pages requires the extended gamut provided by the six-color inks, such as cyan, magenta, yellow, black, green, orange (CMYKGO) or in the case of offset printing, printing a job in a CMYK offset press when some of the pages could be printed on either a monochrome or two-color offset press. In this case, there may be no inserting of pages. However, all pages may eventually be collated so the "inserting" may occur at that operation.

The production system 100 may be, in various exemplary embodiments, implemented on a programmed general purpose computer. However, the production system 100 may also be implemented on a special purpose computer, a programmed microprocessor or microcontroller in peripheral integrated circuits, an ASIC or other integrated circuit, a digital signal processor, a hard wired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 2-4 may be used to implement the production system 100.

It will be appreciated that variations of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A computer-implemented method for processing a print job including both monochrome pages and color pages, comprising:

receiving values at a production manager for characteristic parameters related to printing, non-automated processing and the print job, the characteristic parameters related to printing including per-page process rate and per-page production cost for each of a monochrome printer and a color printer, the characteristic parameters for the print job including a count of monochrome pages, a count of color pages and a count of sets, and the characteristic parameters related to non-automated processing including switching time and switching cost between each of the monochrome printer and the color printer to an interposer, and interposing time and interposing costs to assemble the processed monochrome pages and the processed color pages of the print job into a completed document reproduction;

selecting an optimization criterion as at least one of at least a completion time and a process cost of the print job; and automatically determining a process mode that corresponds to a minimum value of the selected criterion using the production manager, wherein when the optimization criterion is the completion time, determining the process mode comprises:

determining a split process mode time that includes a segregated color print time for printing the color pages of the print job on a color printer, a monochrome print time for printing the monochrome pages of the print job on a monochrome printer and an interposing time for combining the color pages and the monochrome pages of the print job;

determining a color mode time that includes a combined color print time for printing the color pages and the monochrome pages of the print job on the color printer; and determining the minimum value of the optimization criterion based on a minimum between the split mode time and the color mode time, and when the optimization criterion includes the process cost, determining the process mode comprises:

determining a split process mode cost that includes a segregated color print cost for printing the color pages of the print job on a color printer, a monochrome print cost for printing the monochrome pages of the print job on a monochrome printer, and an interposing cost for combining the monochrome pages and the color pages of the print job;

determining a color mode cost that includes a combined color print cost for printing the color pages and the monochrome pages of the print job on the color printer; and determining the minimum value of the optimization criterion based on a minimum between the split mode job cost and the color mode cost.

2. The method according to claim 1, further comprising: printing the print job in accordance with the determined process mode.

3. The method according to claim 1, wherein determining the color mode time further comprises: determining a color-only mode time for printing the color pages and the monochrome pages in color; and determining a color-black-only mode time for printing the color pages in color and the monochrome pages in black-only.

4. The method according to claim 1, wherein determining the color mode cost includes:

determining a color-black-only mode cost that includes the segregated color print cost for printing the color pages of the print job on the color printer, a black-only print cost for printing the monochrome pages of the print job on the color printer, and the interposing cost for combining the monochrome pages and the color pages of the print job;

determining a color-only mode cost that includes a combined color print cost for printing the color pages and the monochrome pages of the print job in color on the color printer; and determining the minimum value of the optimization criterion is based on a minimum between the split mode job cost, the color-black-only mode cost, and the color-only mode cost.

5. A computer-readable storage medium having executable software code for causing a computer to perform processing of a print job including both monochrome and color pages, the software code comprising:

instructions for receiving values for characteristic parameters related to printing, non-automated processing and the print job, the characteristic parameters related to printing including per-page process rate and per-page production cost for each of a monochrome printer and a color printer, the characteristic parameters for the print job including a count of monochrome pages, a count of color pages and a count of sets, and the characteristic parameters related to non-automated processing including switching time and switching cost between each of the monochrome printer and the color printer to an interposer, and interposing time and interposing costs to assemble the processed monochrome pages and the processed color pages of the print job into a completed document reproduction;

instructions for selecting an optimization criterion as at least one of at least a completion time and a process cost of the print job; and instructions for determining a process mode that corresponds to a minimum value of the selected criterion, wherein when the optimization criterion is the completion time, determining the process mode comprises:

determining a split process mode time that includes a segregated color print time for printing the color pages of the print job on a color printer, a monochrome print time for printing the monochrome pages of the print job on a monochrome printer and an interposing time for combining the color pages and the monochrome pages of the print job;

determining a color mode time that includes a combined color print time for printing the color pages and the monochrome pages of the print job on the color printer; and determining the minimum value of the optimization criterion based on a minimum between the split mode time and the color mode time, and when the optimization criterion includes the process cost, determining the process mode comprises:

determining a split process mode cost that includes a segregated color print cost for printing the color pages of the print job on a color printer, a monochrome print cost for printing the monochrome pages of the print job on a monochrome printer, and an interposing cost for combining the monochrome pages and the color pages of the print job;

determining a color mode cost that includes a combined color print cost for printing the color pages and the monochrome pages of the print job on the color printer;

determining the minimum value of the optimization criterion based on a minimum between the split mode job cost and the color mode cost.

6. The medium according to claim 5, further comprising: instructions for printing the print job in accordance with the determined process mode.

7. The medium according to claim 5, wherein determining the color mode time further comprises:

instructions for determining a color-only mode time for printing the color pages and the monochrome pages in color; and instructions for determining a color-black-only mode time for printing the color pages in color and the monochrome pages in black-only.

8. The medium according to claim 5, wherein instructions for determining color mode cost include:

instructions for determining a color-black-only mode cost that include the segregated color print cost for printing the color pages of the print job on the color printer, a black-only print cost for printing the monochrome pages of the print job on the color printer, and the interposing cost for combining the monochrome pages and the color pages of the print job;

instructions for determining a color-only mode cost that include a combined color print cost for printing the color pages and the monochrome pages of the print job in color on the color printer; and the instructions for determining a minimum cost are based on a minimum between the split mode job cost, the color-black-only mode cost, and the color-only mode cost as the optimization criterion.

9. An apparatus for processing a print job including both monochrome and color pages in association with a printing system having a monochrome print engine, a color print engine and an interposer, the apparatus comprising:

a value input that receives values for characteristic parameters for printing, non-automated processing and the print job, the characteristic parameters related to printing including per-page process rate and per-page production cost for each of a monochrome printer and a color printer, the characteristic parameters for the print job including a count of monochrome pages, a count of color pages and a count of sets, and the characteristic parameters related to non-automated processing including switching time and switching cost between each of the monochrome printer and the color printer to an interposer, and interposing time and interposing costs to assemble the processed monochrome pages and the processed color pages of the print job into a completed document reproduction;

a selection input that selects an optimization criterion as at least one of at least completion time and process cost of the print job;

and a mode processor that determines a printing process mode that corresponds to a minimum value of the selected criterion, wherein when the optimization criterion is the completion time, the mode processor comprises:

a split processor that determines a split process mode time that includes a segregated color print time for printing the color pages of the print job on a color printer, a monochrome print time for printing the monochrome pages of the print job on a monochrome printer and an interposing time for combining the color pages and the monochrome pages of the print job;

a color processor that determines a color mode time that includes a combined color print time for printing the color pages and the monochrome pages of the print job on the color printer; and a time-minimizing processor that determines the minimum value of the optimization criterion based on a minimum between the split mode time and the color mode time, and when the optimization criterion includes the process cost, the mode processor comprises:

a split processor that determines a split process mode cost that includes a segregated color print cost for printing the color pages of the print job on a color printer, a monochrome print cost for printing the monochrome pages of the print job on a monochrome printer, and an interposing cost for combining the monochrome pages and the color pages of the print job;

a color processor that determines a color mode cost that includes a combined color print cost for printing the color pages and the monochrome pages of the print job on the color printer;

a cost-minimizing processor that determines the minimum value of the optimization criterion based on a minimum between the split mode job cost and the color mode cost.

10. The apparatus according to claim 9, wherein the printing system comprises a Xerographic printing system and further comprises:

a color printer for printing the color data print job in color, and for printing the monochrome data print job in black-only in response to the determined process mode assigning the color printer;

a monochrome printer for printing the monochrome data print job under the determined process mode as monochrome pages in response to the determined process mode assigning the monochrome printer;

and an interposer for combining the color pages and the monochrome pages of the print job.

11. The apparatus according to claim 9, wherein the color processor further comprises:

a combined color processor that determines a color-only mode time for printing the color pages and the monochrome pages of the print job in color; and a segregated color processor that determines a color-black-only mode time for printing the color pages of the print job in color and the monochrome pages of the print job in black-only using the color printer, and the interposing time for combining the monochrome pages and the color pages of the print job.

* * * * *